(12) United States Patent
Freidberg

(10) Patent No.: US 12,480,307 B2
(45) Date of Patent: Nov. 25, 2025

(54) STRUCTURAL PANEL WITH EXTERIOR INSULATING FOAM LAYER

(71) Applicant: LOUISIANA-PACIFIC CORPORATION, Nashville, TN (US)

(72) Inventor: Neil Freidberg, Lebanon, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 18/238,746

(22) Filed: Aug. 28, 2023

(65) Prior Publication Data

US 2024/0068233 A1    Feb. 29, 2024

Related U.S. Application Data

(60) Provisional application No. 63/430,044, filed on Dec. 4, 2022, provisional application No. 63/401,201, filed on Aug. 26, 2022.

(51) Int. Cl.
*E04B 2/00* (2006.01)
*B32B 3/06* (2006.01)
(Continued)

(52) U.S. Cl.
CPC .............. *E04C 2/296* (2013.01); *B32B 3/06* (2013.01); *B32B 5/18* (2013.01); *B32B 7/12* (2013.01); *B32B 21/02* (2013.01); *B32B 21/047* (2013.01); *B32B 37/10* (2013.01); *B32B 37/12* (2013.01); *B32B 38/0004* (2013.01); *B32B 2266/0228* (2013.01); *B32B 2305/022* (2013.01); *B32B 2307/304* (2013.01); *B32B 2307/4026* (2013.01); *B32B 2307/7265* (2013.01); *B32B 2309/04* (2013.01); *B32B 2309/12* (2013.01); *B32B 2317/16* (2013.01); *B32B 2325/00* (2013.01); *B32B 2607/00* (2013.01); *E04C 2002/004* (2013.01)

(58) Field of Classification Search
CPC ........ E04C 2/296; B32B 3/06; B32B 2317/16
See application file for complete search history.

(56) References Cited

U.S. PATENT DOCUMENTS 3,164,511 A    1/1965  Elmendorf
4,364,984 A   12/1982  Wentworth
(Continued)

FOREIGN PATENT DOCUMENTS

WO    WO 02081841 A1   10/2022

OTHER PUBLICATIONS

International Search Report and Written Opinion, PCT/US23/31267, Lousiana-Pacific Corp. (international filing date Aug. 28, 2023).

(Continued)

*Primary Examiner* — Basil S Katcheves
(74) *Attorney, Agent, or Firm* — Wayne Edward Ramage; Baker Donelson

(57) ABSTRACT

A multi-layer panel product for use as structural sheathing. The panel product comprises a base manufactured-wood structural panel, such as OSB or plywood, with a factory-applied foam layer affixed to the exterior or outward-facing surface. The foam layer provides thermal resistance as an insulation layer. The foam layer also may act as an air and bulk water barrier. The foam layer may be expanded polystyrene (XPS) foam sheets.

15 Claims, 6 Drawing Sheets

(51) Int. Cl.
*B32B 5/18* (2006.01)
*B32B 7/12* (2006.01)
*B32B 21/02* (2006.01)
*B32B 21/04* (2006.01)
*B32B 37/10* (2006.01)
*B32B 37/12* (2006.01)
*B32B 38/00* (2006.01)
*E04C 2/296* (2006.01)
*E04C 2/00* (2006.01)

(56) References Cited

U.S. PATENT DOCUMENTS

| | | | |
|---|---|---|---|
| 4,572,865 A | 2/1986 | Gluck et al. | |
| 4,786,547 A * | 11/1988 | St-Michel | E04B 1/762 |
| | | | 428/317.1 |
| 5,349,796 A | 9/1994 | Meyerson | |
| 5,425,976 A | 6/1995 | Clarke et al. | |
| 5,470,631 A | 11/1995 | Lindquist et al. | |
| 5,525,394 A | 6/1996 | Clarke et al. | |
| 5,695,870 A * | 12/1997 | Kelch | E04B 1/80 |
| | | | 428/317.1 |
| 5,718,786 A | 2/1998 | Lindquist et al. | |
| 6,461,743 B1 | 10/2002 | Tanzer et al. | |
| 8,215,083 B2 | 7/2012 | Toas et al. | |
| 8,966,843 B2 | 3/2015 | Paul et al. | |
| 8,966,845 B1 * | 3/2015 | Ciuperca | B32B 5/18 |
| | | | 52/309.12 |
| 9,010,044 B2 | 4/2015 | Bennett et al. | |
| 10,316,515 B2 | 6/2019 | Budinscak, Jr. et al. | |
| 10,570,616 B2 | 2/2020 | Sealock et al. | |
| 2005/0050847 A1 * | 3/2005 | Lott | E04C 3/28 |
| | | | 52/782.1 |
| 2005/0055930 A1 * | 3/2005 | Imbabi | E04C 2/296 |
| | | | 52/506.01 |
| 2005/0066620 A1 * | 3/2005 | Albora | E04C 2/296 |
| | | | 52/782.1 |
| 2005/0076611 A1 * | 4/2005 | Crawford | E04B 1/762 |
| | | | 52/782.1 |
| 2005/0183385 A1 * | 8/2005 | Ohanesian | E04H 17/168 |
| | | | 52/782.1 |
| 2005/0193676 A1 * | 9/2005 | Palmersten | E04C 2/296 |
| | | | 52/590.2 |
| 2005/0229504 A1 * | 10/2005 | Bennett | E04C 2/24 |
| | | | 52/592.1 |
| 2006/0027948 A1 * | 2/2006 | Grass | B32B 5/08 |
| | | | 442/373 |
| 2006/0096205 A1 * | 5/2006 | Griffin | E04D 3/18 |
| | | | 52/309.4 |
| 2006/0096214 A1 * | 5/2006 | Groschup | E04C 2/386 |
| | | | 52/415 |
| 2006/0185299 A1 * | 8/2006 | Poupart | E04F 13/047 |
| | | | 52/545 |
| 2006/0236653 A1 * | 10/2006 | Showers | E04C 2/296 |
| | | | 52/794.1 |
| 2006/0272279 A1 * | 12/2006 | Palumbo | E04B 1/86 |
| | | | 52/783.1 |
| 2007/0261353 A1 | 11/2007 | Cullen | |
| 2010/0064611 A1 | 3/2010 | Holt | |
| 2011/0258944 A1 | 10/2011 | Radoane | |
| 2012/0247042 A1 * | 10/2012 | Clancy | E04B 1/6104 |
| | | | 29/897.3 |
| 2017/0241135 A1 * | 8/2017 | Budinscak, Jr. | E04C 2/246 |
| 2018/0298609 A1 * | 10/2018 | Banerjee | B32B 5/245 |
| 2021/0348388 A1 | 11/2021 | Budinscak, Jr. et al. | |
| 2021/0396010 A1 | 12/2021 | Rudisill et al. | |
| 2024/0059052 A1 | 2/2024 | Fu et al. | |
| 2024/0059856 A1 | 2/2024 | Fu et al. | |
| 2024/0060303 A1 | 2/2024 | Fu et al. | |

OTHER PUBLICATIONS

International Search Report and Written Opinion, PCT/US23/31259, Lousiana-Pacific Corp. (international filing date Aug. 28, 2023).

\* cited by examiner

STRUCTURAL PANEL WITH EXTERIOR INSULATING FOAM LAYER

This application claims benefit of and priority to U.S. Provisional Application No. 63/430,044, filed Dec. 4, 2022, and to U.S. Provisional Application No. 63/401,201, filed Aug. 26, 2022, both of which are incorporated herein in their entireties by specific reference for all purposes.

FIELD OF INVENTION

This invention relates to a multi-layered panel (which can be wood-based, such as oriented strand board, plywood, or other cellulistic panel) with an exterior-facing insulating foam layer. More particularly, the invention relates to a multi-layered structural panel with an insulating foam layer that serves as an air barrier and is impermeable or substantially impermeable to bulk water.

BACKGROUND OF THE INVENTION

Building wall and roof assemblies are typically layers of several materials, each performing a single function, that are installed separately on the site in which the building is being constructed. Compatibility between the various layers creates challenges not only for the designer, but also for the installers.

A typical layer in most such assembles in a wood panel product, or an integral composite engineered panel product, including, but not limited to, engineered wood composite products formed of lignocellulosic strands or wafers (sometimes referred to as oriented-strand board, or OSB). Products such as fiberboard and particleboard have been found to be acceptable alternatives in most cases to natural wood paneling, sheathing and decking lumber. Fiberboard and particleboard are produced from wood particles bonded together by an adhesive, the adhesive being selected according to the intended use of and the properties desired for the lumber. Oftentimes, the adhesive is combined with other additives to impart additional properties to the lumber. Additives can include fire retardants, insect repellants, moisture resistance, fungus resistance, and color dyes. A significant advantage of fiberboard and particleboard lumber products is that they have many of the properties of plywood, but can be made from lower grade wood species and waste from other wood product production, and can be formed into lumber in lengths and widths independent of size of the harvested timber.

A major reason for increased presence in the marketplace of the above-described product alternatives to natural solid wood lumber is that these materials exhibit properties like those of the equivalent natural solid wood lumber, especially, the properties of retaining strength, durability, stability, and finish under exposure to expected environmental and use conditions. A class of alternative products are multilayer oriented wood strand particleboards, particularly those with a layer-to-layer oriented strand pattern, such as OSB. Oriented, multilayer wood strand boards are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type, and examples of processes for pressing and production thereof, are described in detail in U.S. Pat. No. 3,164,511 (Elmendorf, issued Jan. 5, 1965), U.S. Pat. No. 4,364,984 (Wentworth, issued Dec. 21, 1982), U.S. Pat. No. 5,425,976 (Clarke, et al., issued Jun. 20, 1995), U.S. Pat. No. 5,470,631 (Lindquist, et al., issued Nov. 28, 1995), U.S. Pat. No. 5,525,394 (Clarke, et al., issued Jun. 11, 1996), U.S. Pat. No. 5,718,786 (Lindquist, et al., issued Feb. 17, 1998), and U.S. Pat. No. 6,461,743 (Tanzer, et al., issued Oct. 8, 2002), all of which are incorporated herein in their entireties by specific reference for all purposes.

Certain oriented board products can be made from flakes that are created from debarked round logs by placing the edge of a cutting knife parallel to a length of the log and the slicing thin flakes from the log. The cut flakes are subjected to forces that break the flakes into strands having a length parallel to the grain of the wood several times the width of the strand. The strands can be oriented on the board-forming machine with the strands predominantly oriented in a single (e.g., cross-machine) direction in one (e.g., core) layer and predominantly oriented in the generally perpendicular (machine) direction in adjacent layers. The various layers are bonded together by natural or synthetic resins under heat and pressure to make the finished product. Oriented, multilayer wood strand boards of the above-described type are produced with bending, tensile strengths and face strengths comparable to those of commercial softwood plywood.

Building wall and roof assemblies typically are constructed by attaching several panels of the above-described type as to an underlying supporting structure frame as "sheathing." These sheathing panels are often placed in a pattern with the edge of each panel contacting or positioned close to adjacent panels, thereby forming a substantially continuous flat surface. In certain types of construction, the panels (and other construction materials) may be required under applicable building to meet certain weather resistance or water resistance requirements.

In prior art applications, a manufactured wood panel is installed as sheathing at a job or construction site. After installation, a code-approved water resistant barrier (WRB) system or material is applied. Examples of these WRB systems include housewrap (e.g. Tyvek, Typar), peel-and-stick membranes, or a WRB fluid or liquid applied to the installed panel. However, these systems all rely upon skilled labor for installation at the job. In addition, many of the systems cannot be installed during inclement weather, and require the installed sheathing to be free of defects and provide a clean surface free of debris in order to achieve proper adhesion between the panel and the WRB. As a result, all of these systems can be problematic to install on a job site, and often result in improper installation causing failures in the building "envelope," leading to problems such as moisture instruction or mold or mildew growth. Examples of installation failures include, but are not limited to, reverse lapping, inconsistent thickness of the applied WRB, and improper adhesion of the WRB to the panel. These prior art systems also increase safety risks at the job site, since the installer must handle bulky or clumsy materials at potentially high elevations for long periods of time. Installation of a WRB at a factory prior to transport and installation in the field also is known.

In many locations, some form of insulation is often required in a roof or wall construction, helping to protect and maintain the interior of a structure from high or low temperatures. Insulation typically is added during or after installation of structural panels. Examples of foam insulation board production and installation methods in various contexts are disclosed in U.S. Pat. No. 4,572,865 (Gluck, et al., issued Feb. 25, 1986); U.S. Pat. No. 5,695,870 (Kelch, et al., issued Dec. 9, 1997); and U.S. Pat. Pub. No. 2021/0348388 (Budinscak, Jr., Nov. 11, 2021), all of which are incorporated herein in their entireties by specific reference for all purposes.

Installation of an insulation layer to the interior side of a panel at a factory prior to transport and installation in the field also is known, such as LP NovaCore Thermal Insulated Sheathing, or Isolofoam Isobrace OSB. A structural insulated sheathing panel also is disclosed in Rudisill et al., U.S. Pat. Pub. 2021/0396010 (Dec. 23, 2021), which is incorporated herein in its entirety by specific reference for all purposes. This discloses an insulating layer, including foam polymer insulation, secured to the inward facing surface of a structural panel, with the opposite, exterior facing surface comprises a separate weather-resistant barrier (WRB) layer, in particular a resin-impregnated paper overlay. The gaps between the structural panels when installed on a structure are covered over with a sealant such as water-resistant seam sealant tape. A structural sheathing panel with a weather-resistant barrier (WRB), but without an insulating layer, also is disclosed in Bennett, et al., U.S. Pat. No. 9,010,044 (issued Apr. 21, 2015), which is incorporated herein in its entirety by specific reference for all purposes.

However, the application of multiple barrier layers or other layers of various types to both faces of a panel substantially increases the cost and complexity of the manufacturing process. For example, the layers typically require separate application, curing and application before additional layers are added.

Accordingly, what is needed is a wood or wood composite product panel that provides insulation and air and bulk water resistance in a single layer preapplied at the factory, and without the need for a prior art WRB system to be applied at the job or construction site.

SUMMARY OF INVENTION

The present invention comprises a multi-layer panel product for use as structural sheathing. The multi-layer panel product comprises a base wood or manufactured-wood structural panel, such as OSB or plywood, with a foam board or layer affixed to a face of the base panel in the factory or on a production line, prior to transport and installation at a job site. The product thus comprises a pre-formed, integrated two-layer product.

In a preferred embodiment, the foam layer is affixed to the exterior face of the base panel. The foam layer may be a foam sheet that is laminated, glued, or adhesively attached to the exterior face on a production line in a factory, as described in more detail below. The foam sheet may comprise an XPS (extruded polystyrene) foam, which provides insulation and is bulk water impermeable, or substantially bulk water impermeable. As a result, the multi-layered panel product is impermeable (or substantially impermeable) to penetration by bulk water or other liquids from the exterior side (i.e., the insulating foam face).

The XPS foam sheet may be ½" to 3" in thickness, and sized to correspond to the size (length and width) of the underlying base panel (e.g., 4 foot by 8 foot). The XPS foam sheet covers all or substantially all of the exterior face of the base panel. In some embodiments, the sheet may be co-extensive with the base panel, so the edges of the sheet match and are even with the edges of the exterior face of the base panel. In alternative embodiments, one or more edges of the foam sheet may extend beyond the corresponding edge(s) of the base panel, so that a portion of the foam sheet may cover some or all of a gap or joint formed between adjacent panels. The XPS foam sheet may be colored, either by coloring the foam itself or by a coating. Preferably, the foam sheet is colored white or similar light color to reflect sunlight and prevent the temperature of the foam sheet from increasing beyond acceptable levels.

Impermeable in this context means that the rate of bulk water/liquid transmission is zero. The XPS foam may absorb, but not transmit, water. Water absorption is low, i.e., 0.0 to 0.3% by volume. Substantially impermeable in this context means that the liquid water transmission rate is less than about 3 gms/100 cubic inches/24 hours via Cobb ring test (based on the ASTM D5795 procedure), adjusted for evaporation.

In various embodiments, the XPS foam layer provides an insulation (thermal resistance) rating (i.e., R value). R value depends on thickness of the foam layer (e.g., approximately R5 for every 1 inch of thickness). The foam layer thus provides insulation as well as acting as an air barrier and weather resistant or water resistant barrier (WRB).

DETAILED DESCRIPTION OF EXEMPLARY EMBODIMENTS

Figure 1:
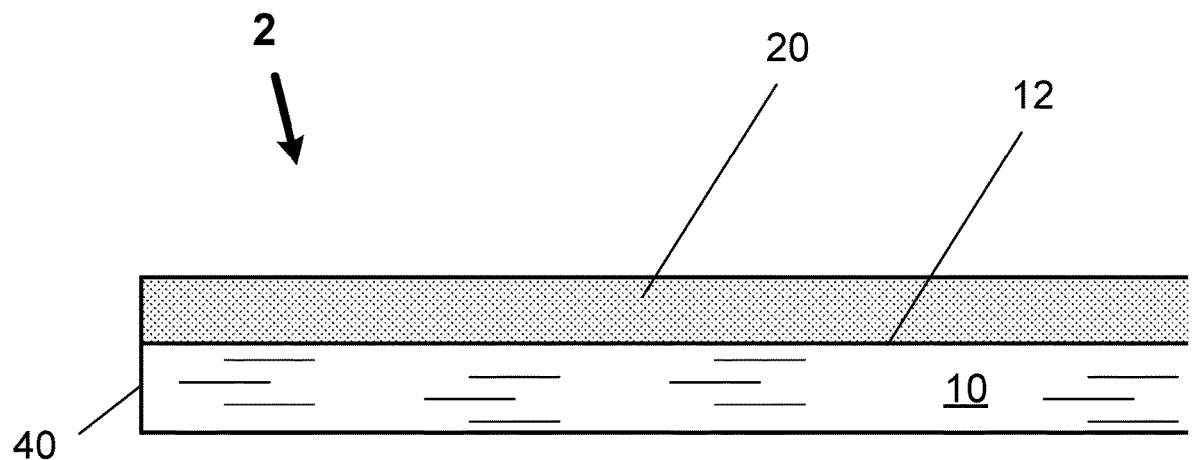
FIG. 1 shows a cross-section of a sheathing panel with an exterior foam layer.
Figure 2:
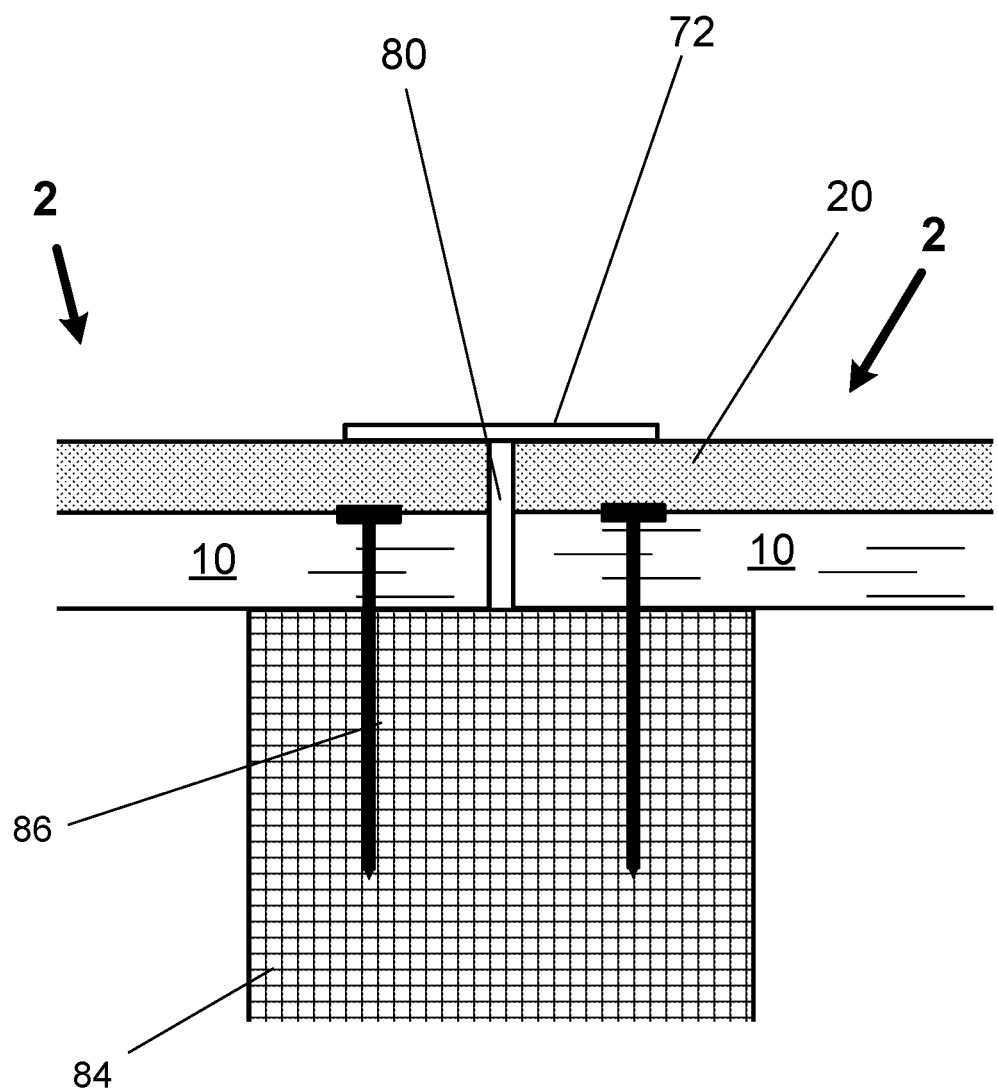
FIG. 2 shows a cross-section of two adjacent panels fastened to a wall or roof stud or framing structure.

In various exemplary embodiments, as seen in FIG. 1, the present invention comprises a multi-layer panel product 2 for use as structural sheathing. The multi-layer panel product comprises a base wood or manufactured-wood structural panel 10, such as OSB or plywood, with a foam board or layer 20 affixed to a face of the base panel in the factory or on a production line, prior to transport and installation at a job site. The product thus comprises a pre-formed, integrated multilayer product.

In a preferred embodiment, the foam layer 20 is affixed to the exterior face 12 of the base panel. The foam layer may be a foam sheet that is laminated, glued, or adhesively attached to the exterior face on a production line in a factory, as described in more detail below. The foam sheet may comprise an XPS (extruded polystyrene) foam, which provides insulation and is bulk water impermeable, or substantially bulk water impermeable. As a result, the multi-layered panel product 2 is impermeable (or substantially impermeable) to penetration by bulk water or other liquids from the exterior side (i.e., the insulating foam face).

The XPS foam sheet may be ½" to 3" in thickness and sized to correspond to the size (length and width) of the underlying base panel (e.g., 4 foot by 8 foot). The XPS foam sheet covers all or substantially all of the exterior face of the base panel. In some embodiments, the sheet may be co-extensive with the base panel, so the edges of the sheet match and are even with the edges of the exterior face of the base panel. In alternative embodiments, one or more edges of the foam sheet may extend beyond the corresponding edge(s) of the base panel, so that a portion of the foam sheet may cover some or all of a gap or joint formed between adjacent panels. The characteristics of a commercial example of XPS foam manufactured by Owens Corning are more fully described in the Product Data Sheet for FOAMULAR & FOAMULAR NGX 250 XPS Insulation, included in the appendix to the specification of U.S. Provisional Application No. 63/430,044, filed Dec. 4, 2022, which is incorporated herein in its entirety by specific reference for all purposes.

The XPS foam sheet may be colored, either by coloring the foam itself or by a coating. Preferably, the foam sheet is colored white or similar light color to reflect sunlight and prevent the temperature of the foam sheet from increasing beyond acceptable levels.

Impermeable in this context means that the rate of bulk water/liquid transmission is zero. The XPS foam may absorb, but not transmit, water. Water absorption is low, i.e., 0.0 to 0.3% by volume, as determined by ASTM C272/C272M-18 (Standard Test Method for Water Absorption of Core Materials for Sandwich Constructions) (last updated Aug. 8, 2018), which is incorporated herein in its entirety by specific reference for all purposes. Substantially impermeable in this context means that the liquid water transmission rate is less than about 3 gms/100 cubic inches/24 hours via Cobb ring test (based on the ASTM D5795 procedure), adjusted for evaporation. It should be noted that the ASTM D5795 Cobb ring test standard is not directly applicable to a foam-sheet insulated panel product in accordance with the present invention.

In various embodiments, the XPS foam layer provides an insulation (thermal resistance) rating (i.e., R value), determined according to ASTM C518-21 (Standard Test Method for Steady-State Thermal Transmission Properties by Means of the Heat Flow Meter Apparatus) (last updated Sep. 28, 2021), which is incorporated herein in its entirety by specific reference for all purposes. R value depends on thickness of the foam layer (e.g., approximately R5 for every 1 inch of thickness). For example, the below table provides the noted R-value for exemplary thicknesses:

| | |
|---|---|
| ½" | R3 |
| ¾" | R4 |
| 1" | R5 |
| 1½" | R7.5 |
| 2" | R10 |
| 2½" | R12.5 |
| 3" | R15 |

During installation at a job or construction site, the adjacent sheathing panels in accordance with the present invention often are gapped or spaced 80 during installation according to appropriate guidelines for the structural sheathing (e.g., ⅛" gapping). The panels 2 are affixed to underlying framing or studs 84 by nails, screws or similar fastening means 86. Preferably, the head of the nail or fastening means after installation sits in contract with the underlying wood or manufactured-wood substrate, below and not within or penetrating the foam board or sheet. The gaps 80 between the panels are then sealed on-site after installation using a sealant means 72, such as, but not limited to, (1) a fluid applied spray sealant comprising silicone or a substance of similar chemical makeup, (2) a fluid applied spray foam sealant, (3) seam or flashing tape that bridges the gap (e.g., approximately 3" in width), which may comprise acrylic adhesives, or (4) self-troweling sealant applied using an electric caulk gun. These sealant means may be water vapor permeable. In several preferred embodiments, the gap or joint sealant is designed specifically for use with XPS foam. In additional embodiments, the sealant means is white or light in color to reflect and not absorb heat from the sun. When installed, the system provides the structure with an integral, monolithic building envelope that functions as an effective water resistive barrier (i.e., resists bulk water) and an effective air barrier system that is vapor permeable.

In several embodiments, the gap or joint sealant extends onto the outer face of the insulating foam layer of the sheathing panel product. This provides a secure seal with the foam layer, and depending on the type of sealant used, also provides a seal around any points of fastener (e.g., nails, screws, and the like) insertion.

In some cases, the sealant possesses elastomeric properties that allows it to "wrap-around" nails or other fasteners that are used, to the extent any such fasteners are exposed or extend to the outer surface. This provides a sealing effect, and is in sharp contrast to prior art housewrap systems, where chipping or tearing often occurs at the point of penetration (thereby compromising the overall integrity of the system). The present system thus reduces the amount and number of materials needed to be delivered and stored at a job site.

Figure 3:
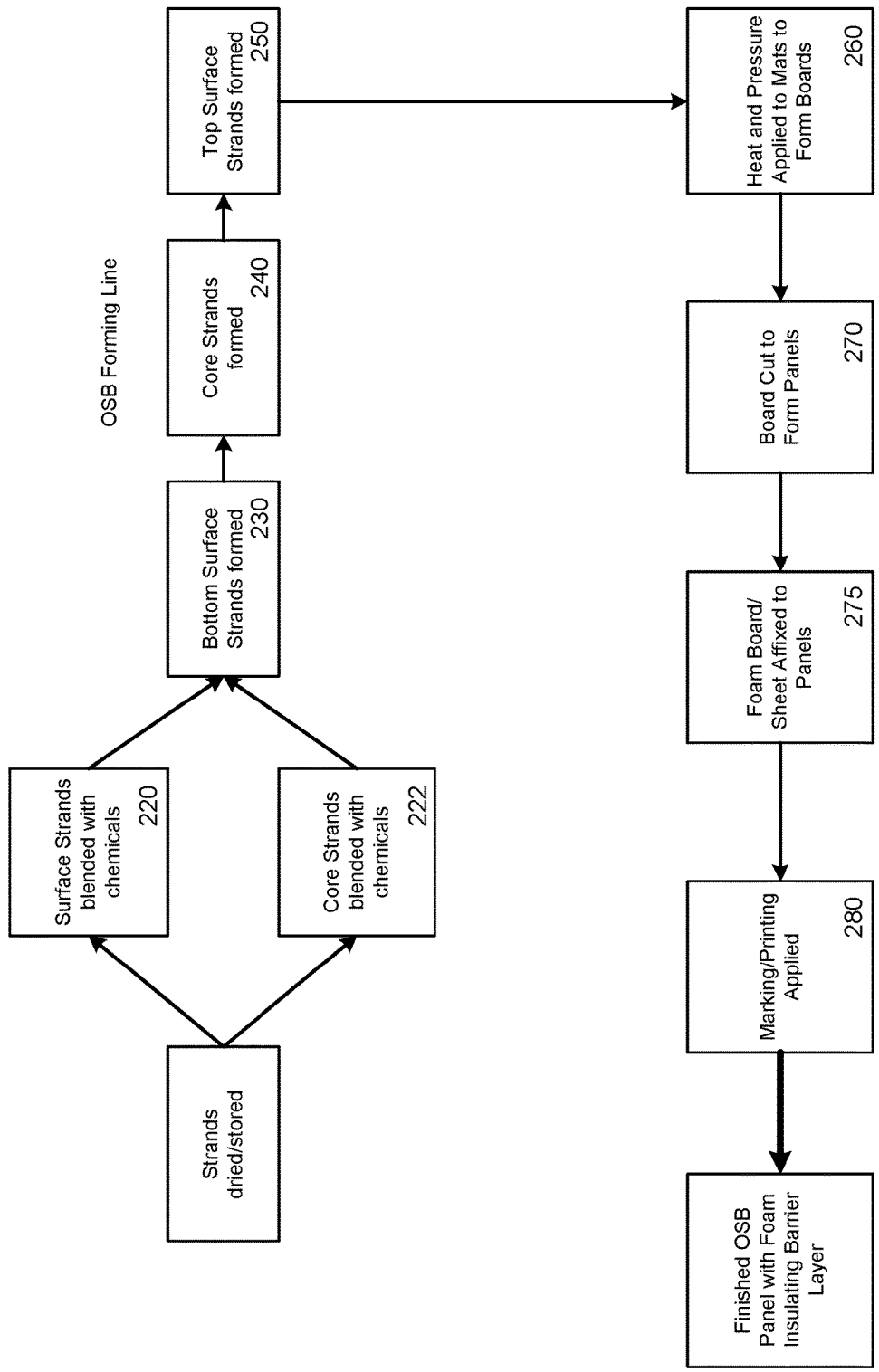
FIG. 3 shows an exemplary process for manufacturing a sheathing panel with an exterior foam layer.

General elements of the OSB manufacturing process, as seen in FIG. 3, include the drying and storing of woods strands 210, the treatment or blending of designated strands (e.g., bottom, core, top) with applicable chemicals or additives (e.g., wax, resin, and the like) 220, 222, the forming of the appropriate layers in order (first bottom surface, then core, then top surface) using designated strands, 230, 240, 250, and the application of heat and pressure to the mats using one or more production presses to form boards 260, with subsequent processing (e.g., boards cut to panel size 270, edges sealed, and packaging) to produce the final manufactured wood panel. The manufactured wood panel typically ranges in thickness by ⅜" to 1", depending on the desired end use, although other thicknesses may be achieved by varying the number and thicknesses of the strand layers In several embodiments, the foam sheet 20 is applied in a secondary pressing process after the boards are cut to panel size 270. In one method, a thin coat of adhesive or glue (e.g., PVA glue) is applied on the face of the base manufactured wood panel. The thickness of the glue typically is in the range of 3 to 12 wet mils, more preferably 6 to 9 wet mils. The foam (e.g., XPS) sheet is that laid on top of the manufactured wood panel 275, with appropriate alignment between respective edges. In an alternative embodiment, the thin coat of adhesive or glue may be applied to a face of the foam panel, which is then laid on top of the manufactured wood panel.

Pressure is then applied to the manufactured wood panel and foam sheet by a secondary press to ensure affixation of the foam sheet to the manufactured wood panel. The secondary press may apply pressure in the range of approximately 15 to approximately 30 psi, more preferably 20 psi, for 5 to 30 minutes, preferably 5 to 20 minutes.

As an alternative to the "cold press" process as described above, a hot press/melt process may be used. The hot press application process is a continuous application and press method. The adhesive is down-sprayed onto the manufactured wood panel at about 6-11 grams per square foot. The foam sheet is then applied over the adhesive and pressed with a roller at a range of 15-30 psi. The final product is then stacked in 20-30 finished panels set aside for 12-24 hours to fully cure.

In some embodiments, an edge sealant may be applied. As the foam panel product travels down a secondary production line, a sealant or coating (similar to or the same as the fluid-applied sealants described above) is spray applied to the edges of the OSB with foam panel product. If a sealant or coating is not sprayed on the edges, the edges may sealed by other means.

In various exemplary embodiments, the fluid or liquid applied sealant comprises a polyurea coating, polyurea prepolymers, polyurethane coating, solvent-based coating, water-based acrylic coating, elastomeric asphalt emulsions, or combinations thereof. Examples of commercially available materials or products include, but are not limited to, the above materials marketed under the trade names RUBINATE, SUPRASEC and JEFFOL (by Huntsman Corporation), POLYQUIK (by Williamette Valley Company), or AIR BLOC (by Henry Company).

After drying, branding or markings, if any, to be applied to the panel are then applied or printed on the coated surface of the desired face, such as by using a digital printer or other stamping process. This marking also may be performed in the manufacturing line.

The foam layer is bulk water impermeable or substantially bulk water impermeable, as described above, while water vapor permeable, with a water vapor permeance from about 1.2 to about 3 perms (U.S.) (based on ASTM E96 Procedure B), with ratings dependent upon the foam sheet thickness. In several embodiments, the foam panels of the present invention may be characterized by a liquid water transmission rate from approximately 0 (i.e., impermeable) to less than 1 to 3 gms/100 cubic inches/24 hours via Cobb ring test, based on ASTM D5795 (Standard Test Method for Determination of Liquid Water Absorption of Coated Wood and Wood Based Products Via "Cobb Ring" Apparatus) (last updated Dec. 27, 2016), and a water vapor permeance from about 1.2 to about 3 perms (U.S.), based on ASTM E96 Procedure B (Standard Test Methods for Water Vapor Transmission of Materials) (last updated Aug. 16, 2017), both of which are incorporated herein in their entireties by specific reference for all purposes.

As alternative to the gap or joint sealing methods described above, the foam layer may be configured with self-sealing joint elements along the edges, as disclosed in U.S. patent application Ser. No. 18/238,693, "Self-Sealing Insulated Panel," filed Aug. 28, 2023, by Louisiana-Pacific Corporation, claiming priority to U.S. Provisional Application No. 63/401,201, filed Aug. 26, 2022, both of which are incorporated herein in their entireties by specific reference for all purposes. Disclosed therein is a self-sealing insulated panel 102, comprising an insulating foam board (or foam insulation board) 104 adhered or attached to a manufactured wood structural panel (e.g., oriented-strand board (OSB), plywood, or the like) 106. The corresponding opposing edges 112, 114 of the insulating foam board comprise the two corresponding elements (overlap 112 and underlap 114) of a modified ship-lap joint 110. The insulating foam board may have overlap elements 112 on two adjacent edges, and underlap elements 114 on the other two edges, so that adjacent boards can be positioned to form the complete joint 110, as seen in FIGS. 5 and 6.

Figure 4:
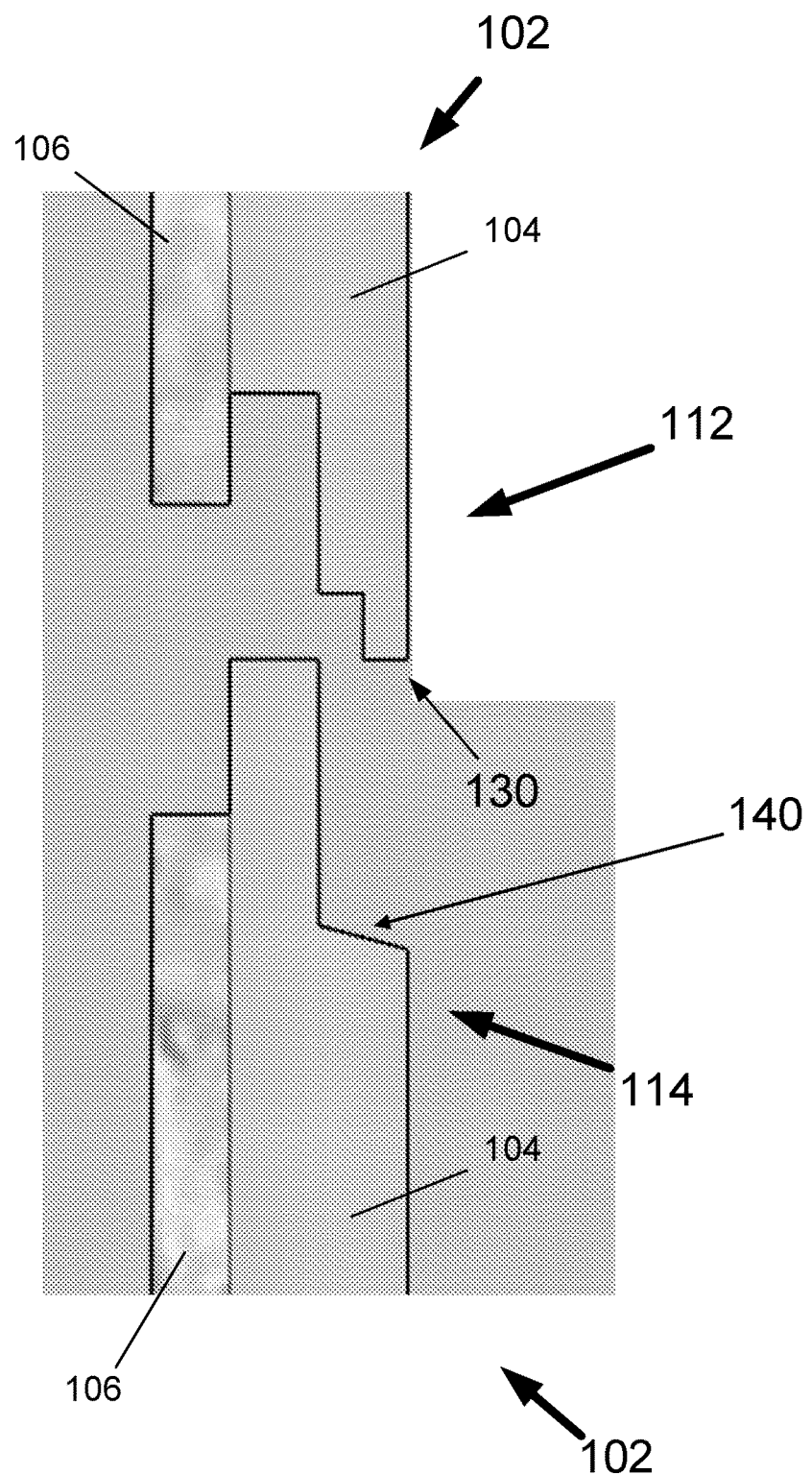
FIG. 4 shows a cross section of two adjacent joint edges of a sheathing panel with an exterior foam layer with a modified shiplap joint profile.
Figure 5:
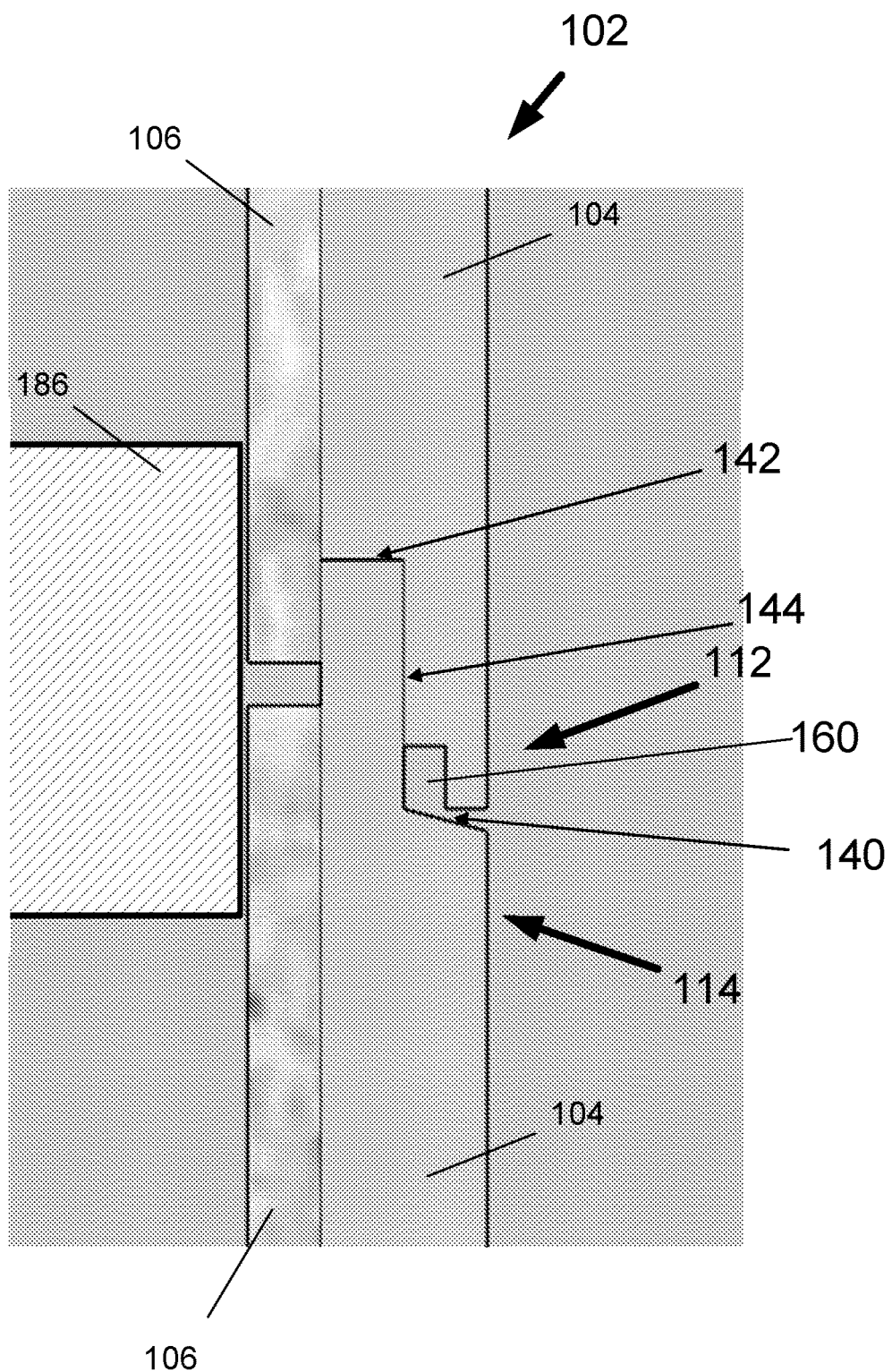
FIG. 5 shows a cross-section of the modified shiplap joint formed by the adjacent joint edges of FIG. 4.
Figure 6:
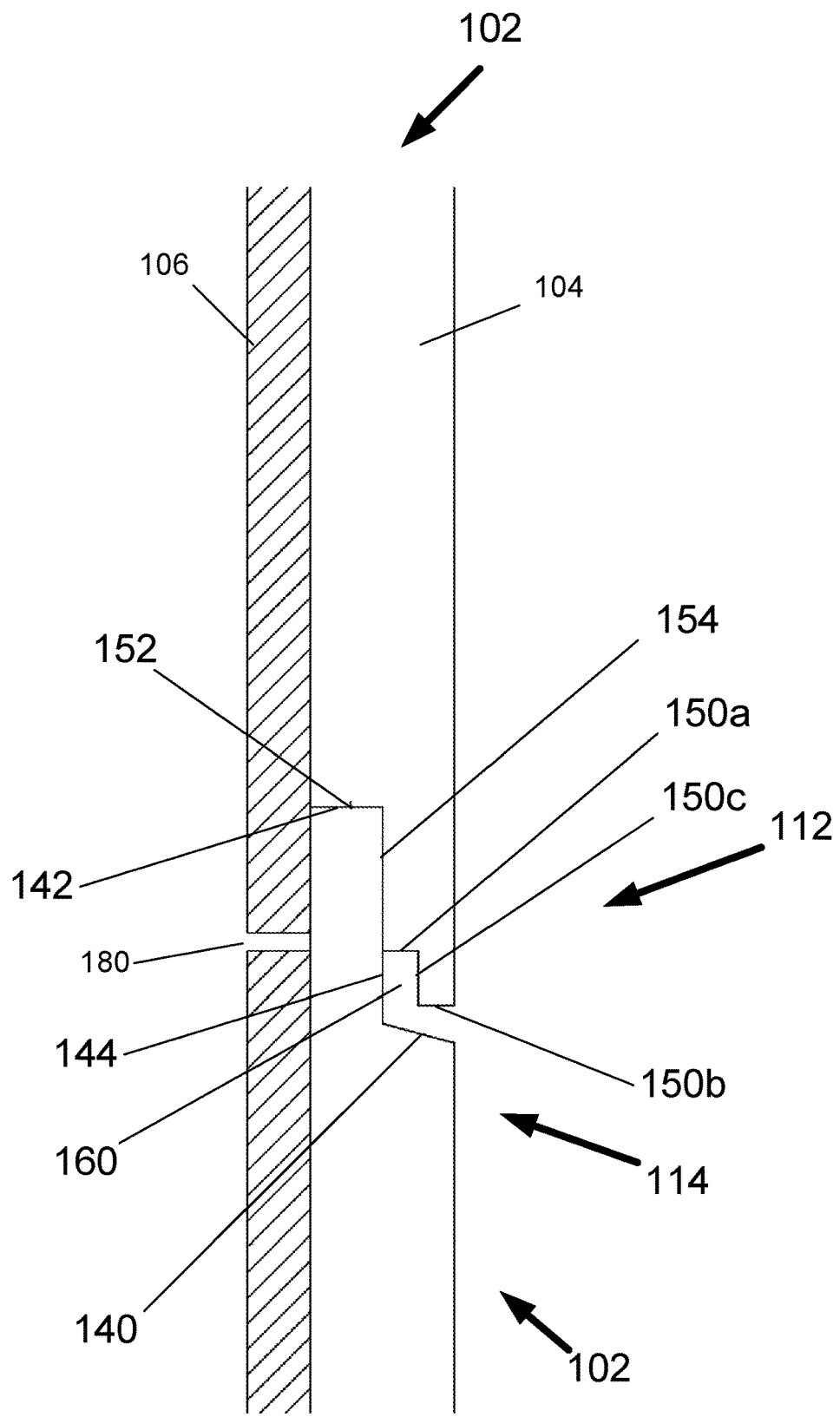
FIG. 6 shows another cross-section of the joint formed by FIG. 4.

As seen in FIGS. 4-6, the underlap element 114 comprises an outward-facing main face 144 generally parallel to the front (or outer) face and back (or inner) face of the panel, an inner edge face 142 generally orthogonal to the underlap main face 144 and extending therefrom to the back face of the panel, and an angled or sloped outer edge face 140 extending at an obtuse angle from the underlap main face 144 to the front face of the panel. Similarly, the overlap element 112 comprises an inward-facing main face 154 generally parallel to the front (or outer) face and back (or inner) face of the panel, an inner edge face 152 generally orthogonal to the overlap main face 154 and extending therefrom to the back face of the panel, and an outer edge face with two portions 150a, b generally orthogonal to the overlap main face 154 with a third portion therebetween 150c generally parallel to the main face 154, with the outermost outer edge face portion 150b extending the from the third portion 150c to the front face of the panel.

A self-sealing insulated panel 102 may be installed with other similar panels in a correct shingling pattern vertically or horizontally for drainage. The foam board profiling allows an adjacent foam board to seat with another foam board, edge-to-edge, and form the joint. When interlocked and nailed or otherwise fastened to the wall or other structural frame, the foam board joint along the horizontal edges, formed with the overlap element 112 on the upper panel and the underlap element 114 on the lower panel, provides a drip edge 130 preventing water from flowing into the joint and then into the interior of the wall. The sloped angle formed by the underlap angled outer edge face 140 below the drip edge 130, and the open spacing 160 between the joint elements when the joint is formed, allows for a passive flow of water out of the joint and prevents a capillary effect drawing water into the joint.

As seen in FIGS. 4 and 5, when the joint is fully formed, the joint elements are sized to provide a gap 180 between the respective edges of the two underlying manufactured wood structural panels 106. This allows lateral expansion and retraction of the manufactured wood structural panels 106 without buckling or warping. In the embodiment shown, the gap is ⅛" wide, although the joint elements may be sized to provide for different gap spacing, as desired.

When the joint is fully formed, the respective inner edge faces 142, 152 of the joint elements in the foam boards 104 are fully seated and in contact with each other, and the entirety of the overlap main face 154 is in contact with the portion of the underlap main face 144 adjacent the respective inner edge face. A portion of the underlap main face 144 is not in contact with any portion of the overlap element, and thus forms and is open to the space 160. The length of the open portion of the underlap main face is longer than or at least as long as the length of the third portion 150c of the overlap outer edge. No portion of the respective outer edge faces 140, 150a-c is in contact with any portion of the other outer edge face.

The present invention possesses several advantages over the prior art. It provides a savings in time and labor, as a secondary contractor is not needed to apply the WRB system after a sheathing panel is installed. Further, applying the foam board or sheet in a controlled setting (e.g., manufacturing facility) allows the foam sheet the opportunity to fully bond with the panel. More specifically, the foam sheet can fully cure independent of weather conditions, and be applied to a clean manufactured wood base panel without interference from construction-related dirt, debris or humidity. Further, since the foam layer is preapplied to the panel, it reduces the number of possible penetrations in the wall assembly installation process, and thereby reduces air infiltration into the wall cavity. The present invention also prevents air movement between the foam layer and the face of the underlying base manufactured wood panel. These enhancements increase system performance, installation reliability and structure durability while decreasing construction related waste.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A structural sheathing system, comprising:
   two or more structural panel products, each panel product comprising an exterior face, an interior face, and edges therebetween, said panel products configured to be secured to a building frame with the interior face adjacent the building frame and with respective adjacent edges forming a gap therebetween;
   wherein each structural panel product comprises two layers, a wood-base panel with an outer surface and an inner surface, and an insulation layer with an exterior-facing surface and an interior-facing surface, wherein the interior-facing surface of the insulation layer is affixed to the outer surface of the wood-base panel and the inner surface of the wood-base panel forms the interior face, wherein each structural panel product is secured to said building frame by a plurality of nails penetrating the wood-base panel;
   wherein the insulation layer covers all of the outer surface of the wood-base panel; and
   wherein the insulation layer consists of extruded polystyrene (XPS) foam; and
   wherein each wood-base panel has flat edges orthogonal to the outer surface and inner surface, and opposing edges of each insulation layer form corresponding joint elements of a modified ship-lap joint, said joint elements comprising an underlap element with an outward-facing main face and an angled face extending therefrom to the outer face of the foam insulation board, wherein the angled face is at an obtuse angle with respect to the outward-facing main face and an overlap element with an inward-facing main face and a drip edge along the outermost edge, wherein the drip edge is not in contact with any part of the underlap element when the joint is formed, and the angled face is not in contact with any part of the overlap element when the joint is formed.

2. The system of claim 1, wherein the insulation layer is affixed by glue or adhesive to the outer surface of the wood-base panel.

3. The system of claim 1, wherein the insulation layer is a preformed sheet of extruded polystyrene (XPS) foam.

4. The system of claim 1, wherein the insulation layer is a thermal resistance insulation barrier with an R-Value of 5 per one inch of thickness at 75 degrees F. mean temperature.

5. The system of claim 1, wherein the insulation layer is impermeable to bulk water transmission.

6. The system of claim 1, wherein the insulation layer is substantially impermeable to bulk water transmission.

7. The system of claim 1, wherein the wood-base panel and the insulation layer are pre-formed into an integrated two-layered configuration.

8. The system of claim 1, wherein the insulation layer is white in color.

9. The system of claim 1, wherein the exterior-facing surface of the insulation layer is white in color.

10. The system of claim 1, where the exterior-facing surface of the insulation layer is the exterior face of the panel product.

11. The system of claim 1, wherein the wood-base panel comprises wood-composite or engineered-wood composite material.

12. The system of claim 1, wherein the wood-base panel comprises oriented-strand board, fiberboard, particleboard, or plywood.

13. The system of claim 1, further comprising sealing means for the gap, wherein said sealing means comprises tape.

14. The system of claim 1, wherein the insulation layer is affixed by adhesive to the exterior-facing surface.

15. The system of claim 1, wherein the modified ship-lap joint, when the joint is formed, is configured to direct water flow down the outer surface of the overlap element and off of the drip edge without entering the gap between panels.

* * * * *